United States Patent [19]
Nishimura

[11] Patent Number: 5,666,346
[45] Date of Patent: Sep. 9, 1997

[54] SUPER-RESOLUTION MAGNETOOPTICAL RECORDING MEDIUM USING MAGNETIC PHASE TRANSITION MATERIAL, AND METHOD FOR REPRODUCING INFORMATION FROM THE MEDIUM

[75] Inventor: Naoki Nishimura, Tokyo, Japan

[73] Assignee: Canon Kabushiki Kaisha, Tokyo, Japan

[21] Appl. No.: 511,223

[22] Filed: Aug. 4, 1995

[30] Foreign Application Priority Data

Aug. 24, 1994 [JP] Japan ............................ 6-199802

[51] Int. Cl.$^6$ ................................................ G11B 11/00
[52] U.S. Cl. ........................................ 369/275.2; 369/13
[58] Field of Search .................. 369/13, 275.1–275.4

[56] References Cited

U.S. PATENT DOCUMENTS

| | | | |
|---|---|---|---|
| 5,367,509 | 11/1994 | Fukumoto et al. | 369/13 |
| 5,420,846 | 5/1995 | Sugiyama et al. | 369/13 |
| 5,432,774 | 7/1995 | Fukumoto et al. | 369/275.3 |
| 5,493,545 | 2/1996 | Matsumoto | 369/13 |
| 5,502,692 | 3/1996 | Osato | 369/13 |

FOREIGN PATENT DOCUMENTS

| | | |
|---|---|---|
| 0492553 | 7/1992 | European Pat. Off. . |
| 0498461 | 8/1992 | European Pat. Off. . |
| 0586175 | 3/1994 | European Pat. Off. . |
| 0586122 | 3/1994 | European Pat. Off. . |
| 0603670 | 6/1994 | European Pat. Off. . |
| 0604065 | 6/1994 | European Pat. Off. . |
| 2-281442 | 11/1990 | Japan . |
| 6-20330 | 1/1994 | Japan . |
| 6-124500 | 5/1994 | Japan . |

OTHER PUBLICATIONS

Patent Abstracts of Japan, vol. 16, No. 502, published Oct. 16, 1992.
English Abstract of Japanese Patent No. 4–181534.
Patent Abstracts of Japan, vol. 16, No. 100, published Mar. 11, 1992.
English Abstract of Japanese Paent No. 3–276441.
Patent Abstracts of Japan, vol. 15, No. 47, published Feb. 5, 1991.
English Abstract of Japanese Patent No. 2–281442.

*Primary Examiner*—Nabil Hindi
*Attorney, Agent, or Firm*—Fitzpatrick, Cella, Harper & Scinto

[57] ABSTRACT

A magnetooptical recording medium and a method for reproducing information from the medium wherein the medium includes a first magnetic layer which has in-plane magnetization at room temperature and vertical magnetization at an elevated temperature, a second magnetic layer for storing information which has vertical magnetization between room temperature and its Curie temperature, and a third magnetic layer disposed between the first and second magnetic layers and made of a magnetic phase transition material which undergoes a reversible change from antiferromagnetism to ferromagnetism at a phase transition temperature near the temperature at which the first magnetic layer changes from in-plane magnetization to vertical magnetization.

4 Claims, 4 Drawing Sheets

DISC TRAVELING DIRECTION
TEMPERATURE DISTRIBUTION IN TRACK CENTER

FIG. 2
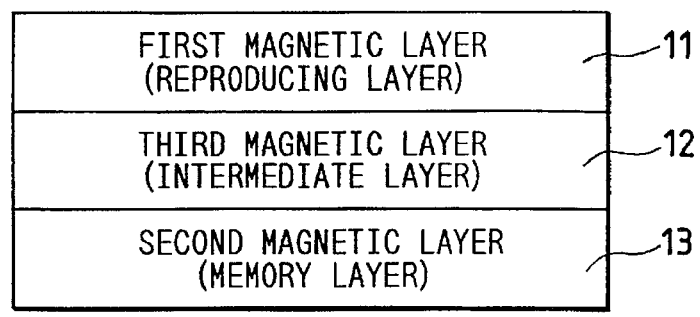
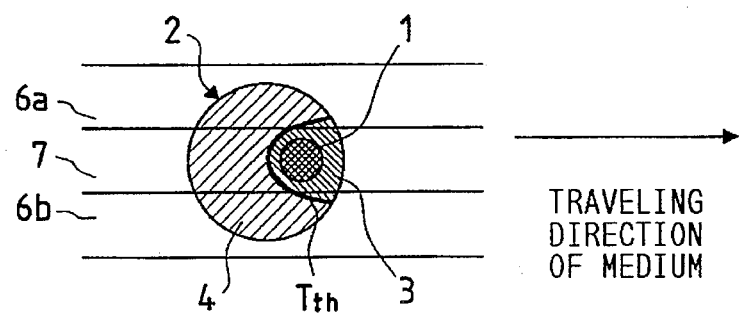
FIG. 3A
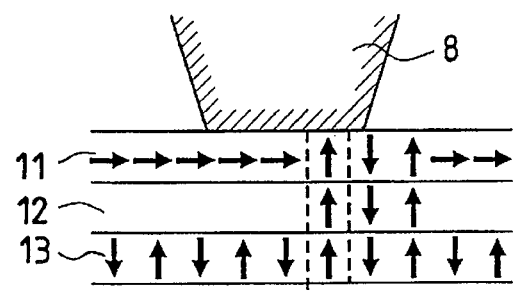
FIG. 3B
FIG. 3C
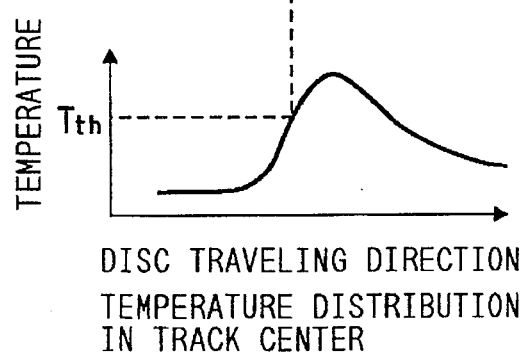
DISC TRAVELING DIRECTION
TEMPERATURE DISTRIBUTION
IN TRACK CENTER

SUPER-RESOLUTION MAGNETOOPTICAL RECORDING MEDIUM USING MAGNETIC PHASE TRANSITION MATERIAL, AND METHOD FOR REPRODUCING INFORMATION FROM THE MEDIUM

BACKGROUND OF THE INVENTION

1. Field of the Invention

The present invention relates to a magnetooptical recording medium for recording and/or reproducing information with a laser beam, utilizing the magnetooptical effect, and a method for reproducing information from the magnetooptical recording medium, and more particularly to a magnetooptical recording medium enabling high-density recording and a method for reproducing information using the medium.

2. Related Background Art

As rewritable high-density recording media, attention is being given to magnetooptical recording medium in which information is recorded by writing magnetic domains in a magnetic thin film using the thermal energy of a semiconductor laser and from which the information is read using the magnetooptical effect. In addition, there is the growing desire to further enhance the recording density of magnetooptical recording media to obtain higher-capacity recording media.

The linear recording density of optical discs including magnetooptical recording media depends largely on the laser wavelength $\lambda$ of the reproduction optical system used and the numerical aperture NA of an objective lens that is used. The size (spot size) of the beam of a reproduction laser light is determined once the reproducing light wavelength $\lambda$ and the numerical aperture NA of an objective lens are determined. The shortest mark length is about $\lambda/2NA$, which is the reproducible limit. Meanwhile, the track density is restricted mainly by crosstalk between adjacent tracks, and depends upon the spot size of the reproducing beam, as the shortest mark length does. Accordingly, in order to realize high recording density with the conventional optical discs, it becomes necessary to shorten the laser wavelength of the reproduction optical system or to increase the numerical aperture NA of the objective lens.

However, shortening the wavelength is not easy because it reduces efficiency, produces heat and shortens the life of the laser device. On the other hand, increasing the numerical aperture of the objective lens makes machining of the lens difficult and the distance between the lens and the optical disc becomes too short, thus raising the problem of collision between the objective lens and the optical discs.

The inventor proposed in Japanese Laid-Open Patent Application No. 6-124500 a super-resolution technique necessitating no external magnetic field upon reproduction and realizing a recording density of over the optical resolution of reproducing light (corresponding to the above spot size), and a magnetooptical recording medium suitable for the super-resolution technique.

FIG. 1A is a cross section of an example of the magnetooptical recording medium to which the super-resolution technique is applicable. The magnetooptical recording medium (optical disc) is constructed in a lamination structure of an interference layer 43, a reproducing layer 41, a memory layer 42, and a protective layer 44 formed in that order on a transparent substrate 50, and arrows shown in the reproducing layer 41 and memory layer 42 represent the directions of the iron group element sublattice magnetization in the magnetic layers. The memory layer 42 is comprised of a film with a large vertical magnetic anisotropy, for example such as TbFeCo or DyFeCo, and the reproducing layer 41 is comprised of a film which is a longitudinal magnetic layer at room temperature but turns into a vertical magnetic layer with an increase of temperature to above a threshold temperature $T_{th}$. Recording information for this medium is retained by orienting the directions of magnetic domains formed in the memory layer 42 upward or downward with to the film surface.

When a light beam 38 for reproduction of information is projected on the medium of this structure from the side of substrate 50 while rotating the medium, the temperature gradient becomes as shown in FIG. 1C at the center of a data track (FIG. 1B) composed of grooves 36a, 36b and a land 37. Observing it from the side of substrate 50, there is an isotherm of temperature $T_{th}$ as represented by the U-shaped thick solid line in FIG. 1B, within a light spot 32 formed by the light beam 38. As described above, the reproducing layer 41 is a longitudinal magnetic layer in the region below the temperature $T_{th}$ (the right-upwardly hatched region in the drawing), which does not contribute to the polar Kerr effect (or which forms a front mask region 34). Thus, the recording magnetic domains retained in the memory layer 42 are masked to become invisible from the viewpoint of the magnetooptical effect. On the other hand, the reproducing layer 41 becomes a vertical magnetic layer in the region above $T_{th}$ (the left-upwardly hatched region in the drawing), and directions of sublattice magnetization in the reproducing layer 41 become aligned with those of the recording information in the memory layer 42 because of an exchange coupling force. As a result, the recording magnetic domains in the memory layer 42 are transferred to the reproducing layer 41 only in an aperture region 33 smaller in size than the spot 32, whereby reproducing signals can be detected only from a region smaller than the radius of light spot 32, whereby the size of recording mark 31 can be made fully smaller than the size of light spot 32, thus realizing super resolution.

Since in this super-resolution reproducing method the low-temperature region in the light spot 32, i.e., the front mask region 34 extends toward adjacent tracks, this method can increase the track density as well as the linear recording density.

In the super-resolution reproducing method as disclosed in Japanese Laid-Open Patent Application No. 6-124500, there, however, exists a magnetic domain wall between the reproducing layer and the memory layer in the magnetooptical recording medium of the two-layer structure of magnetic layers, and the magnetic domain wall permeates the reproducing layer with weaker magnetic anisotropy. Therefore, the transition of the reproducing layer from a longitudinal magnetic layer to a vertical magnetic layer with an increase in temperature occurs not steeply but gradually, which makes unclear the border between the mask region and the aperture region. If the longitudinal magnetic anisotropy of the reproducing layer is enhanced at room temperature in order to solve this problem, there occurs a problem that it becomes difficult to turn the reproducing layer into a perfect, vertical magnetic layer at the reproducing temperature. For example, if the reproducing layer is made of a heavy rare earth-iron group transition metal alloy in an RE rich state (where the magnitude of a magnetization vector of a rare earth element is greater than that of an iron group element), the rate of addition of Co is increased in order to prevent the Curie temperature of the reproducing layer from dropping and the rate of addition of the rare earth element is increased to increase the saturation magnetization $M_s$ at room temperature so as to enhance the longitudinal magnetic anisotropy, which also increases the compensation temperature at the same time, resulting in failing to decrease the saturation magnetization $M_s$ sufficiently upon reproduction and thus failing to obtain a perfect, vertical magnetic layer. In contrast, if the longitudinal anisotropy is decreased at room temperature, the perfect, vertical magnetic film can be attained at the reproducing temperature, but the border between the mask region and the aperture region becomes unclear at temperatures below it because the longitudinal anisotropy of the reproducing layer is weak. In addition, it becomes difficult for the reproducing layer to perfectly mask the magnetic information in the memory layer. Accordingly, the method in the Japanese Laid-Open Patent Application No. 6-124500 is susceptible to improvement in order to obtain good reproduction signals where the recording mark length or the track width is decreased in the medium.

Thus, the present inventor proposed a super-resolution magnetooptical recording medium (in Japanese Patent Application No. 6-45594 filed Mar. 16, 1994) in which the longitudinal anisotropy of the reproducing layer is enhanced at room temperature by providing, between the reproducing layer and the memory layer, an intermediate layer having a stronger longitudinal anisotropy at room temperature than the reproducing layer and a lower Curie temperature than the reproducing layer and in which the reproducing layer turns into a sufficient, vertical magnetic layer upon reproduction, whereby the magnetic information in the memory layer can be transferred to the reproducing layer. In this case, for example, the saturation magnetization $M_s$ of the intermediate layer is made greater than that of the reproducing layer, whereby the longitudinal anisotropy of the intermediate layer is enhanced at room temperature. Therefore, the intermediate layer is greatly influenced by the external magnetic field and the magnetostatic field from the medium at room temperature and there is a possibility that the quality of signals is degraded because the intermediate layer is influenced upon reproduction by a magnetic field generated by a magnetooptical recording apparatus (for example, a magnetic field from an external magnet for recording).

SUMMARY OF THE INVENTION

An object of the present invention is to provide a magnetooptical recording medium, based on a further improvement in the super-resolution magnetooptical recording media as described above, wherein the reproducing layer is a longitudinal magnetic film at room temperature, which can perfectly mask the magnetic information in the memory layer in the temperature range of from the room temperature to a temperature immediately below a temperature of the high-temperature portion in the light spot of a reproducing beam, which can reproduce the recording information very well in the high-temperature portion in the light spot, and which can further improve the linear recording density and the track density on a stable basis, and to provide an information reproduction method using the magnetooptical recording medium.

The above object can be achieved by a magnetooptical recording medium comprising:

a transparent substrate;

a first magnetic layer laid on the substrate, the first magnetic layer having an in-plane magnetization at room temperature and a vertical magnetization at an elevated temperature;

a second magnetic layer for storing information, the second magnetic layer being laid on the first magnetic layer and having vertical magnetization between the room temperature and a Curie temperature thereof; and a third magnetic layer disposed between the first magnetic layer and second magnetic layer and made of a magnetic phase transition material undergoing reversible transition from antiferrromagnetism to ferromagnetism;

wherein the antiferromagnetism-ferromagnetism phase transition temperature of the third magnetic layer is near a temperature at which the first magnetic layer changes from in-plane magnetization to vertical magnetization.

Also, the above object can be achieved by an information reproducing method for reproducing information from a magnetooptical recording medium comprising:

a transparent substrate;

a first magnetic layer laid on the substrate, the first magnetic layer having an in-plane magnetization at room temperature and a vertical magnetization at an elevated temperature;

a second magnetic layer for storing information, the second magnetic layer being laid on the first magnetic layer and having a vertical magnetization between the room temperature and a Curie temperature thereof; and a third magnetic layer disposed between the first magnetic layer and second magnetic layer and made of a magnetic phase transition material undergoing reversible transition from antiferromagnetism to ferromagnetism;

wherein the antiferromagnetism-ferromagnetism phase transition temperature of the third magnetic layer is near a temperature at which the first magnetic layer changes from an in-plane magnetization to a vertical magnetization, the method comprising:

a step of forming a light spot as an irradiating laser light through the substrate to the first magnetic layer;

a step of causing a temperature distribution caused by irradiation of the medium by the laser light to define, in the light spot, a first region in which the magnetization of the first magnetic layer is oriented mainly longitudinally and in which magnetic domain information in the second magnetic layer is masked against reading by the magnetooptical effect, and a second region in which the first magnetic layer changes into a vertical magnetization and in which the magnetic domain information recorded in the second magnetic layer is transferred to the first magnetic layer; and a step of reproducing the magnetic domain information in the second region by the magnetooptical effect, utilizing reflected light of the laser light.

BRIEF DESCRIPTION OF THE DRAWINGS

FIGS. 1A to 1C are drawings to show a conventional magnetooptical recording medium and information reproducing method thereof, wherein FIG. 1A is a diagrammatic cross section, FIG. 1B is a diagrammatic plan view, and FIG. 1C a graph to show a temperature distribution at the track center;

FIG. 2 is a diagrammatic cross section to show the basic structure of a magnetooptical recording medium of the present invention;

FIGS. 3A to 3C are drawings to illustrate the principle of an information reproducing method of the present invention, wherein FIG. 3A is a plan view of a light spot, FIG. 3B is a drawing to show magnetized states of magnetic layers, and FIG. 3C is a drawing to show a temperature distribution;

FIGS. 4A to 4C are drawings to illustrate the principle of an information reproducing method with the addition of a thermal conductive layer, wherein FIG. 4A is a plan view of a light spot, FIG. 4B is a drawing to show magnetized states of magnetic layers, and FIG. 4C a drawing to show a temperature distribution;

DETAILED DESCRIPTION OF THE PREFERRED EMBODIMENTS

Figure 1A:
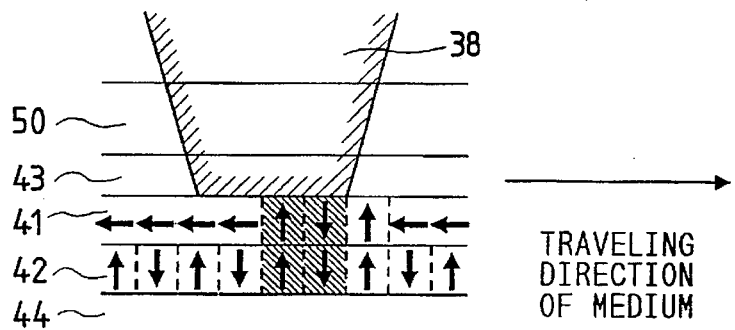

The magnetooptical recording medium of the present invention is constructed to have such a structure that an intermediate layer (third magnetic layer) is provided between the reproducing layer (first magnetic layer) and the memory layer (second magnetic layer) in the super-resolution magnetooptical recording medium as described above and that the intermediate layer (third magnetic layer) is made of a magnetic phase transition material which undergoes a reversible antiferromagnetism-ferromagnetism phase transition and which has a transition temperature near the transition temperature $T_{th}$ of the in-plane magnetization-vertical magnetization transition of the reproducing layer. With this structure, in the high-temperature portion of a light spot, the reproducing layer changes into the vertical magnetic film and the intermediate layer changes into the ferromagnetic phase, and the intermediate layer mediates exchange coupling between the reproducing layer and the memory layer, whereby domain information in the memory layer is correctly transferred to the reproducing layer. On the other hand, in the portion other than the high-temperature portion of the light spot the reproducing layer remains as the longitudinal magnetic layer and the intermediate layer is in the antiferromagnetic phase, and the exchange coupling is interrupted between the reproducing layer and the memory layer, resulting in completely masking the domain information in the memory layer. This medium permits the quality of reproduction signals in a super resolution state to be improved without adversely being affected by an external magnetic field or the random magnetic field inside the medium.

In the magnetooptical recording medium of the present invention, the intermediate layer (third magnetic layer) may be comprised of FeRh as a main ingredient, whereby the quality of signals reproduced from the medium can be further improved and the medium can be produced easily. If the medium is further provided with a thermally conductive layer, particularly a thermally conductive layer made of a metal material mainly containing Al, thermal profiles can be made concentric in the light spot on the magnetooptical recording medium, variations in the magnetic phase transition on the medium can be suppressed, and the quality of reproduction signals can be improved.

Now, the magnetooptical recording medium and information reproducing method using the medium according to the present invention will be described in detail by reference to the drawings.

FIG. 2 is a diagrammatic cross section to show the basic layer structure of the magnetooptical recording medium according to the present invention. The magnetooptical recording medium is constructed in a lamination structure of the reproducing layer 11 of a first magnetic layer, and the intermediate layer 12 of a third magnetic layer, and the memory layer 13 of a second magnetic layer arranged in this order from the incidence side of reproducing light. The reproducing layer 11 is made from a magnetic film which is a longitudinal magnetic film at room temperature but turns into a vertical magnetic film between the room temperature and the Curie temperature of the memory layer 13. The intermediate layer 12 is made of a magnetic phase transition material which reversibly changes from having antiferromagnetism to having ferromagnetism and which has the antiferromagnetism-ferromagnetism phase transition temperature near the temperature at which the reproducing layer 11 changes from the longitudinal magnetic film to the vertical magnetic film. Further, the memory layer 13 is made from a vertical magnetic film which can stably hold magnetic information.

The reproducing layer 11 is a layer for reproduction of magnetic information retained in the memory layer 13, which is, as described above, located closer to the incident side of reproducing light than the memory layer 13 and is made from the magnetic layer which is a longitudinal magnetic film at room temperature but turns into a vertical magnetic film between the room temperature and the Curie temperature of the memory layer 13. Transition occurs from a longitudinal magnetic film to a vertical magnetic film, for example with compositions having their compensation temperature between the room temperature and the Curie temperature. It is desired to set the Curie temperature of the reproducing layer 11 higher than at least the Curie temperature of the memory layer 13 in order to prevent the Kerr rotation angle from being degraded upon reproduction. Examples of the material for the reproducing layer 11 are rare earth-iron group amorphous alloys, specifically materials mainly containing GdFeCo, such as GdFeCo, GdTbFeCo, GdDyFeCo, or NdGdFeCo, which are preferred because of their high Curie temperature and low coercive force. If the reproducing layer 11 is too thin, it would be insufficient to mask the magnetic information in the memory layer 13, whereas if the layer 11 is too thick, it would require high laser power for recording. Thus, an appropriate range of film thickness of the reproducing layer 11 is between 15 nm and 100 nm, preferably between 20 nm and 60 nm, more preferably between 25 nm and 45 nm.

The intermediate layer 12 is located between the reproducing layer 11 and the memory layer 13 and is made, as described above, of a material which undergoes such reversible magnetic phase transition that it is antiferromagnetic at room temperature, changes from having antiferromagnetism to having ferromagnetism when the temperature is raised up to near the temperature at which the reproducing layer 11 changes into a vertical magnetic layer, and returns again to being an antiferromagnetic member when the temperature is lowered to the room temperature. Then the intermediate layer 12 functions to shield the exchange force from the memory layer 13 when it is antiferromagnetic in the temperature region where the reproducing layer 11 is a longitudinal magnetic film and to mediate the exchange coupling force when becoming ferromagnetic whenever the reproducing layer 11 becomes a vertical magnetic layer. Examples of the material for the intermediate layer 12 are magnetic layers mainly containing either of FeRh, MnSb, MnCrSb, HfTaFe, and MnPt. Among them FeRh is most preferred because it can readily form a magnetic film having the magnetic phase transition temperature of above room temperature. Further, an additive element, such as Pd, Pt, or Ir may be added to FeRh in order to adjust the magnetic phase transition temperature, for example. If the intermediate layer 12 is too thin, it would be insufficient to shield the coupling force from the memory layer 13 at room temperature, whereas if layer 12 is too thick, it would require high laser power upon recording. Thus, the thickness range of the intermediate layer 12 is preferably between 2 nm and 20 nm both inclusive, more preferably between 5 nm and 15 nm both inclusive. The magnetic phase transition temperature of the intermediate layer 12 is preferably set near the temperature at which the reproducing layer 11 changes from a longitudinal magnetic film to a vertical magnetic film, specifically within the range of ±5° C. of the temperature.

The memory layer 13 is to be a vertical magnetic layer between the room temperature and the Curie temperature and to be a layer for storing recording information, and needs to be capable of stably retaining magnetic domains. Examples of materials for the memory layer 13 may include those having great vertical magnetic anisotropy and being capable of stably retaining magnetized states, for example rare earth-iron group transition metal alloys such as TbFeCo, DyFeCo, and TbDyFe, garnet, or platinum group-iron group periodic structure films, for example such as Pt/Co or Pd/Co.

The reproducing layer 11, intermediate layer 12 or memory layer 13 may include an additive element for improving corrosion resistance, such as Al, Ti, Pt, Nb, or Cr. In addition to these reproducing layer 11, intermediate layer 12, and memory layer 13, the magnetooptical recording medium of the present invention may include a layer made of a dielectric such as $SiN_x$, $AlO_x$, $TaO_x$, or $SiO_x$ in order to enhance an interference result or protection performance. A layer with high thermal conduction, such as Al, AlTa, AlTi, AlCr, or Cu, may be provided in order to improve thermal conduction and to achieve a more preferred temperature distribution in the recording medium. In order to perform optical modulation overwrite, the recording medium may include an initialization layer in which magnetization is aligned in one direction or an auxiliary layer for adjusting the exchange coupling force or the magnetostatic coupling force to facilitate the recording or reproducing procedure. Further, the recording medium may include, as a protective film, a dielectric layer made of the dielectric as described above or a protective coat made of a polymer resin.

Next described are recording and reproducing processes of the present invention.

With the magnetooptical recording medium according to the present invention, recording domains are first formed in the memory layer of the medium, according to data signals (recording process). As the recording method there are methods using optical modulation, such as a method (erase-write recording) in which recording information on the medium is first erased and then new information is recorded by modulating laser power while applying a magnetic field in the recording direction, the method (overwrite recording) in which new data is directly recorded on old data by modulating laser power while applying the external magnetic field, etc. In use of these optical modulation recording methods, if the intensity of the laser light is determined taking account of the linear velocity of the recording medium so that only a predetermined region inside the light spot of the laser beam for recording reaches the temperature near the Curie temperature of the memory layer, recording domains smaller than the diameter of the light spot can be formed, and as a result, signals can be recorded at periods below the diffraction limit of light. In the case of the overwrite recording while irradiating and modulating the laser light with such power that the memory layer comes to exceed the Curie temperature, the modulation speed is set to a high speed according to the linear velocity of the medium, whereby recording domains smaller than the diameter of the light spot can be formed, and as a result, signals can be recorded at periods below the diffraction limit of light.

Next explained is the reproduction of signals from the magnetooptical recording medium in which signals were recorded at periods smaller than the diffraction limit of light as described above. The reproducing method of the present invention achieves magnetic super-resolution reproduction by apparently masking some region in the light spot formed by the reproducing light, from the viewpoint of the magnetooptical effect. FIGS. 3A to 3C are drawings to illustrate the principle of an information reproducing apparatus of the present invention, wherein FIG. 3A is a plan view of the light spot, FIG. 3B is a drawing to show the magnetization states of the respective magnetic layers, and FIG. 3C is a drawing to show a temperature distribution. In FIG. 3B, arrows given in respective layers represent the directions of the main sublattice magnetization or the directions of overall magnetization.

Let us suppose that land 7 and grooves 6a, 6b are formed in the medium and that recording mark 1 is to be formed in the land 7. The diameter of the recording mark 1 is smaller than that of light spot 2 on the medium. Assuming the medium is moving relative to the light spot 2, as indicated by the illustrated arrow, the front end region of light spot 2 with respect to the traveling direction of the medium is over the transition temperature $T_{th}$ between the longitudinal magnetic film and the vertical magnetic film of reproducing layer 11. The thick solid line as illustrated represents an isotherm of the temperature $T_{th}$. In the light spot 2, the region of less than the temperature $T_{th}$ (the right-upwardly hatched region in the drawing) is a front mask region 4, and the region of not less than the temperature $T_{th}$ (the left-upwardly hatched region in the drawing) is an aperture region 3. In the front mask region 4 of a low-temperature region, the reproducing layer 11 remains a longitudinal magnetic film, functioning as an optical mask. In the aperture region 3 of a high-temperature region, the reproducing layer 11 becomes a vertical magnetic film, so that domain information in the memory layer 13 is transferred to the reproducing layer 11 by exchange coupling, thereby enabling detection of recording information. From the viewpoint of the magnetooptical effect utilizing reflected light, because only signals from the aperture region 3 are detected, a signal from the recording mark 1 can be reproduced even if the diameter of recording mark 1 is smaller than that of light spot 2. Namely, super-resolution reproduction becomes possible.

The magnetooptical recording medium of the present invention is characterized in that the magnetic phase transition material is used for the intermediate layer 12 provided between the reproducing layer 11 and the memory layer 13. Properties of this intermediate layer are next explained.

The intermediate layer is an antiferromagnetic substance at room temperature (a magnetic substance in which adjacent spins among magnetic substances are directed in mutually opposite directions to cancel each other, becomes ferromagnetic at temperatures of not less than the magnetic phase transition temperature, and returns to being an antiferromagnetic substance when the temperature drops to the room temperature. Accordingly, the intermediate layer is always antiferromagnetic in the temperature range of from the room temperature to the magnetic phase transition temperature. Thus, the exchange coupling force from the memory layer is completely shielded by the intermediate layer, so that the reproducing layer is not subject to an effective magnetic field from the memory layer due to exchange coupling, thus becoming perfectly, a longitudinal magnetic film. This enables the reproducing layer to completely mask magnetic information recorded in the memory layer. In FIG. 3B the antiferromagnetic phase is indicated by a blank space.

On the other hand, the intermediate layer becomes ferromagnetic by a magnetic phase transition at the reproducing temperature (the temperature of the aperture region in the light spot). In this case, the reproducing layer is at a temperature over the transition temperature $T_{tn}$ and becomes a vertical magnetic film, and thus stably changes into the vertical magnetic film because of the exchange coupling force from the memory layer. Thus, magnetic information in the memory layer is transferred to the reproducing layer by the exchange coupling force, and it becomes possible to reproduce the magnetic information by the magnetooptical effect. Even though the intermediate layer itself does not have the vertical magnetic anisotropy at the reproducing temperature, the directions of magnetization of the intermediate layer are aligned with directions normal to the film plane, that is, parallel to the directions of magnetization of the memory layer and reproducing layer, by the magnetic coupling force from the memory layer and the reproducing layer comes to have a vertical magnetic anisotropy. Accordingly, the intermediate layer functions to effectively transfer the magnetic information in the memory layer to the reproducing layer.

Since the intermediate layer is antiferromagnetic between the room temperature and the magnetic phase transition temperature thereof, it is free of the influence of the external magnetic field or the magnetostatic field from the recording medium. Thus, the intermediate layer will not be affected upon reproduction by the magnetic field from the magnetooptical recording apparatus, for example by the external magnet for recording, whereby a mask is stably produced by the reproducing layer, thus improving the quality of reproduction signals. When the reproducing layer becomes a vertical magnetic film to be exchange-coupled with the memory layer through the intermediate layer, it is free, upon reproduction, of the adverse effect not only from the magnetostatic field inside the medium, but also from an external magnetic field for recording, because of the sufficiently strong exchange coupling force.

The intermediate layer is, for example, a magnetic layer containing FeRh as a main ingredient. Examples of applications of FeRh to magnetooptical recording media are already published. For example, the bulletin Of Japanese Laid-Open Patent Application No. 2-281442 discloses an attempt to use a FeRh layer as an auxiliary layer in an optical modulation overwrite medium to expand the threshold range of laser power and to decrease the initialization magnetic field. In this case, the auxiliary layer of FeRh is used for the purpose of decreasing the magnetic interaction due to magnetostatic interaction between the recording layer and the auxiliary recording layer at room temperature but increasing it at high temperature. Also, the bulletin of Japanese Laid-Open Patent Application No. 6-20330 discloses an attempt to form information bits or tracks by using FeRh with thermal hysteresis and causing irreversible magnetic phase transition of the memory layer made of FeRh etc. by the heat of laser light.

In the present invention the magnetic phase transition material represented by FeRh, however, is used for the following purposes, different from the above-discussed conventional examples, thereby achieving the magnetic super-resolution effect which is not disclosed in the above conventional examples.

A first purpose of using the magnetic phase transition material for the intermediate layer in the present invention is to adjust the exchange interaction force between the reproducing layer and the memory layer in reverse and in stages. In detail, the intermediate layer made of the magnetic phase transition material is provided so that it shields the exchange force from the memory layer at low temperatures before the reproducing layer is transferred into the vertical magnetic film, to keep the reproducing layer in the state of in-plane magnetization and so that it permits the magnetic information from the memory layer to be efficiently transferred to the reproducing layer after the reproducing layer changes into a vertical magnetic layer. This improves the quality of reproduction signals.

A second purpose for use of such an intermediate layer is to reduce the influence from the external magnetic field and to keep the reproducing layer stably in the longitudinal magnetic film in the front mask region even if there exists the external magnetic field. This can further improve the quality of reproduction signals.

Figure 4A:
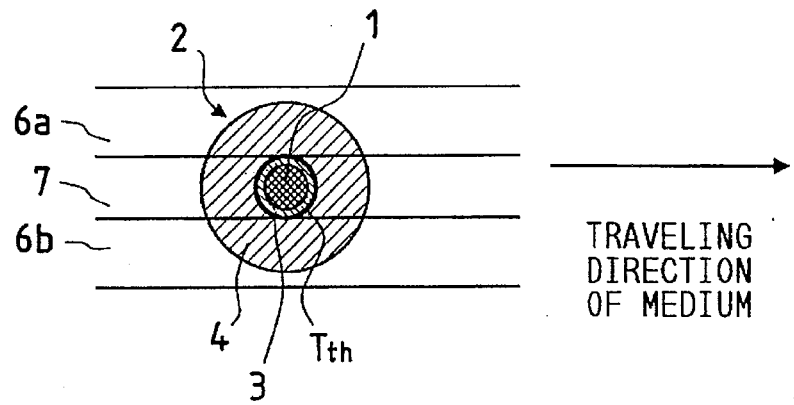
Figure 4B:
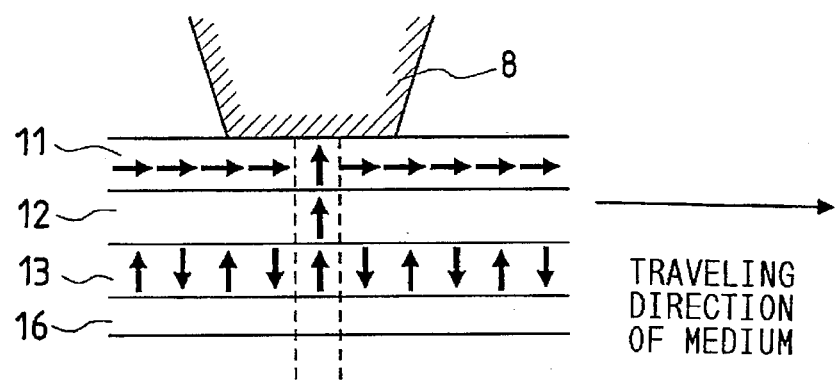
Figure 4C:
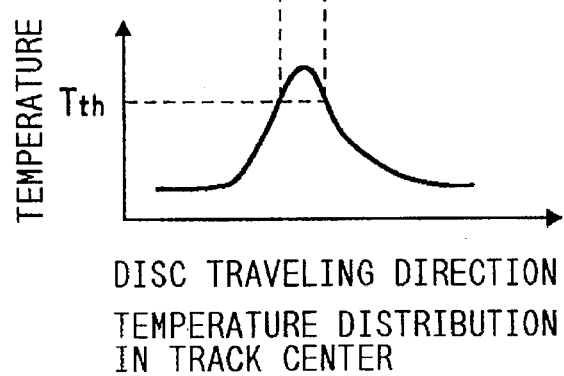

The magnetooptical recording medium of the present invention may further include a layer with high thermal conduction (thermally conductive layer) such as Al, AlTa, AlTi, AlCr, or Cu. A preferred material for the thermally conductive layer is a metal material containing Al as a main ingredient. FIGS. 4A to 4C are drawings similar to FIGS. 3A to 3C, but different in that the thermally conductive layer 16 is provided. Since the example shown in FIGS. 3A to 3C excludes the thermally conductive layer, the aperture region 3 is offset from the center of the light spot 2; whereas, where the thermally conductive layer 16 is laid directly or through a dielectric layer on the memory layer 13, the peak of the temperature distribution in the medium comes to near the center of the light spot 2, as shown in FIG. 4C. This defines the aperture region 3 in the central portion of the light spot 2 and the front mask region surrounding the aperture region 3. In this case, the quality of reproduction signals is further improved because reproduction is done in the center of the light spot 2, that is, in the portion with strong light intensity.

The present invention will be further described in more detail with experimental examples. It should be, however, noted that the present invention is by no means limited to the following experimental examples.

EXAMPLE 1

In order to check the magnetic properties of the FeRh film, the FeRh film was formed on a glass substrate using a dc magnetron sputter apparatus. Controlling the power to an Fe target and an Rh target, the composition of the FeRh film was adjusted at an atomic ratio of Fe:Rh=47:53. The film thickness of the FeRh film was 100 nm. After completion of formation of the FeRh film, SiN was further formed in the thickness of 80 nm as a protective film.

Figure 5:
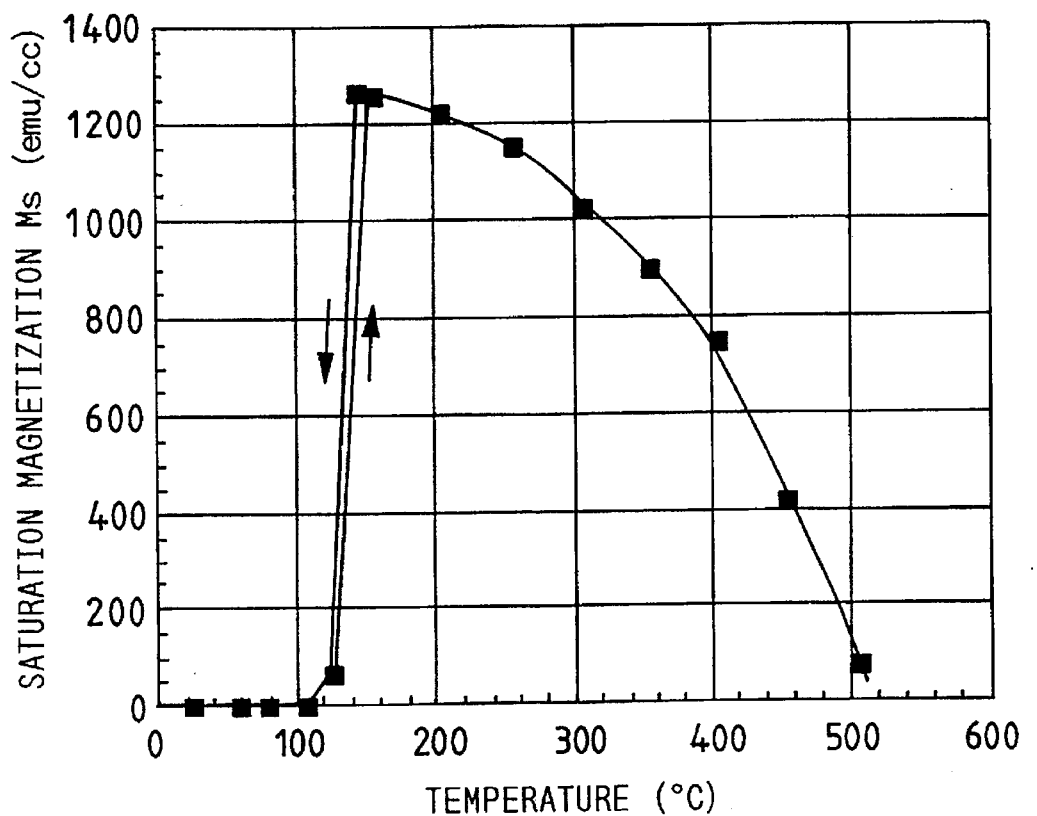
FIG. 5 is a drawing to show the temperature dependence of magnetization of an FeRh thin film.

Using a vibrating-sample magnetometer, magnetization of a sample of the FeRh thin film thus obtained was measured as an external magnetic field was applied thereto. In measurement, the sample was heated from room temperature to 500° C. as space including the sample was evacuated by a rotary pump to $1 \times 10^{-3}$ Pa. FIG. 5 shows a change of magnetization against temperature when the external magnetic field of 5 kOe was applied. As shown in FIG. 5, this FeRh sample underwent reversible magnetic phase transition from antiferromagnetism to ferromagnetism. Magnetization suddenly took place at about 130° C. in case of a temperature rise, while the transition occurred at almost the same temperature in the case of a temperature decrease.

Next checked was the influence of an additive element to FeRh. When 5 to 10% Ir with respect to Rh was added to FeRh in the above composition, the phase transition temperature became about 170° C. to 280° C. higher than the sample without additive, depending upon the amount of the additive. Similarly, when 2 to 6% Pd with respect to Rh was added, the phase transition temperature became about 50° C. to 150° C. lower than that of the sample without the additive. When the amount of Rh in the FeRh thin film was changed in the range of 48 to 62 atomic %, the magnetic phase transition temperature became higher as the content of Rh increased. It was found that the preferred content of Rh was in the range of 50 to 60 atomic % in case of the intermediate layer being the FeRh film, taking account of the relation with preferred reproducing temperature (the condition that the reproducing region must be in the ferromagnetic phase).

EXAMPLE 2

Figure 6:
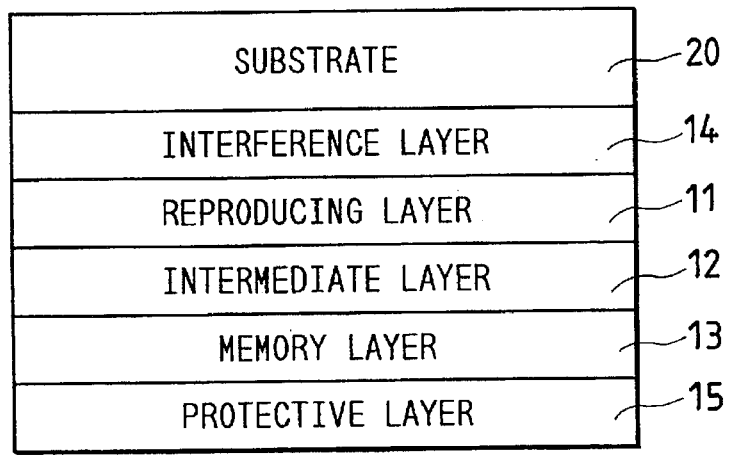
FIG. 6 is a diagrammatic cross section to show the structure of a magnetooptical recording medium according to the present invention, produced in Example 2.

Next prepared was the magnetooptical recording medium of the present invention with the intermediate layer of the FeRh thin film. FIG. 6 is a cross section to show the structure of the medium prepared. This medium was constructed in such a lamination structure that interference layer 14, reproducing layer 11, intermediate layer 12, memory layer 13, and protective layer 15 were successively laid in this order on a transparent substrate 20.

First, targets of Si, Gd, Tb, Fe, Co, and Rh were set in the dc magnetron sputter apparatus, and a pre-grooved glass substrate of diameter 130 mm was fixed in a substrate holder set at a position where the distance to the targets was 150 mm. After that, the chamber was evacuated by a cryo-pump up to the high vacuum of below $1 \times 10^{-5}$ Pa. Next, Ar gas was introduced into the chamber to 0.4 Pa as continuing evacuation, and then the SiN interference layer was formed at a thickness of 90 nm and the GdFeCo reproducing layer at a thickness of 40 nm. Next, the FeRh intermediate layer was formed at a thickness of 12 nm, the TbFeCo memory was formed at a thickness of 35 nm, and the SiN protective layer at a thickness of 70 nm, successively. In the film formation of the SiN interference layer and SiN protective layer, the film formation was brought about by reactive sputtering as $N_2$ gas in addition to the Ar gas was introduced into the chamber and the mixture ratio of the gases was adjusted so as to obtain an index of refraction of 2.2.

The GdFeCo reproducing layer showed the composition of $G_{30}$ $(Fe_{65}Co_{35})_{70}$, the RE rich property (where the magnetization vector of rare earth atoms is greater than that of iron group atoms) at room temperature, the saturation magnetization $M_s$ of 196 emu/cc, the compensation temperature of 240° C., and the Curie temperature of not less than 300° C.

Further, the TbFeCo memory layer showed a composition of $Tb_{18}$ $(Fe_{88}Co_{12})_{82}$, a TM rich property at room temperature, a saturation magnetization $M_s$ of -120 emu/cc, and a Curie temperature of 220° C.

Next, recording and reproducing properties were measured using this magnetooptical recording medium. The measurement was carried out under the conditions that the numerical aperture NA of an objective lens was 0.55, the laser wavelength was 780 nm, the recording power was in the region of 7 to 13 mW, the reproducing power was in the range of 2.5 to 3.5 mW, and the powers were set so as to obtain the highest C/N (carrier to noise) ratio. The linear velocity of the medium was set to 9 m/s. First, recorded information in the surface of the medium was erased, then carrier signals of 5.8 MHz, 11.3 MHz, and 15 MHz (corresponding to mark lengths of 0.78 μm, 0.40 μm, and 0.30 μm, respectively) were recorded in the memory layer to check the mark length dependence on the C/N ratio.

Next, crosstalk with an adjacent track (hereinafter referred to simply as crosstalk) was measured. The crosstalk was obtained as follows. A signal of mark length 0.78 μm was recorded in a land portion by the above method and a carrier signal intensity C1 was measured. Then tracking was set on a next groove portion after erasure, where a carrier signal intensity C2 was measured in the same manner. Then the crosstalk was obtained as a difference (C2–C1) between them.

Figure 1B:
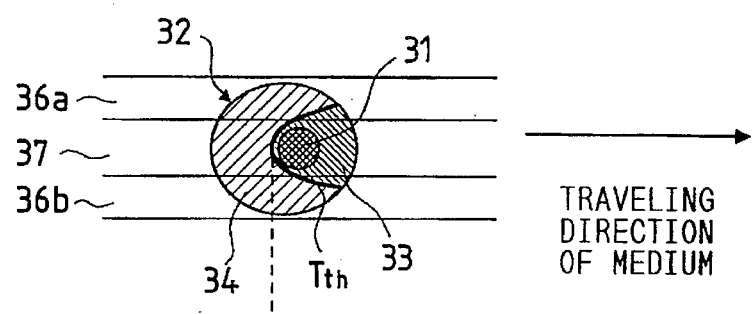
Figure 1C:
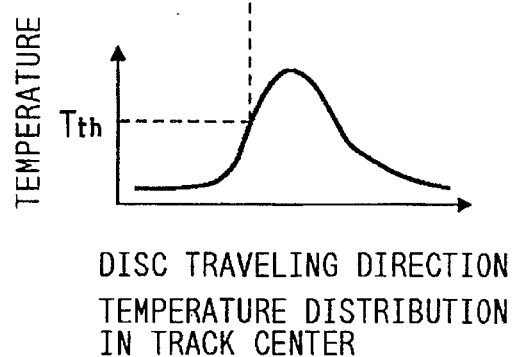

The C/N and crosstalk were measured without applying an initialization magnetic field or a reproducing magnetic field. Measurement results of C/N and crosstalk are listed in FIG. 1.

EXAMPLE 3

Using the same film-forming apparatus as in Example 2, a magnetooptical recording medium was obtained in the same lamination structure by successively forming on a polycarbonate substrate, an SiN interference layer at a thickness of 90 nm, a GdFeCo reproducing layer at a thickness of 40 nm, an FeRhIr intermediate layer at a thickness of 10 nm, a TbFeCo memory layer at a thickness of 35 nm, and an SiN protective layer at a thickness of 70 nm.

The GdFeCo reproducing layer showed a composition of $Gd_{28}(Fe_{65}Co_{35})_{72}$, an RE rich property at room temperature, a saturation magnetization $M_s$ of 160 emu/cc, a compensation temperature of 180° C., and a Curie temperature of not less than 300° C.

The FeRhIr intermediate layer showed a composition of $Fe_{47}(Rh_{95}Ir_5)_{53}$ and a magnetic phase transition temperature of about 150° C.

The TbFeCo memory layer showed a composition of $Tb_{18}(Fe_{88}Co_{12})_{82}$, a TM rich property at room temperature, a saturation magnetization $M_s$ of -120 emu/cc, and a Curie temperature of 220° C.

Next, similarly as in Example 2, mark length dependence of C/N and crosstalk of the magnetooptical recording medium thus obtained were checked. The results are listed in Table 1.

Next, magnetic super-resolution magnetooptical recording media of the conventional example were prepared, and they were similarly evaluated and measured as comparative examples using the same apparatus in the above examples, which is discussed below.

COMPARATIVE EXAMPLE 1

Next, the same medium as the medium as described in Japanese Laid-Open Patent Application No. 6-124500, which is a magnetooptical recording medium without the intermediate layer of the magnetic phase transition material, was prepared and evaluated. Using the same film-forming apparatus and film-forming method as in Example 2, an SiN interference layer was first formed at a thickness of 90 nm on a glass substrate, and subsequently, a GdFeCo reproducing layer was formed at a thickness of 40 nm, a TbFeCo memory layer was formed at a thickness of 40 nm, and an SiN protective layer was formed at a thickness of 70 nm in this order, thus producing a magnetooptical recording medium.

The composition of the GdFeCo reproducing layer was set so that the composition was RE rich at room temperature, the saturation magnetization $M_s$ was 180 emu/cc, the compensation temperature was 240° C., and the Curie temperature was not less than 300° C. Also, the composition of the TbFeCo memory layer was set so that it was TM rich at room temperature, the saturation magnetization was $M_s$ 150 emu/cc, and the Curie temperature was 250° C.

After that, similarly, as in Examples 2 and 3, mark length dependence of C/N ratio and crosstalk were measured. The results are listed in Table 1.

COMPARATIVE EXAMPLE 2

A magnetooptical recording medium with an intermediate layer, which was not made of the magnetic phase transition material, was prepared and evaluated. Using the same film-forming apparatus and film-forming method as in Example 2, an SiN interference layer was first formed at a thickness of 90 nm on a glass substrate, and subsequently, a GdFeCo reproducing layer was formed at a thickness of 40 nm, a GdFe intermediate layer was formed at a thickness of 10 nm, a TbFeCo memory layer was formed at a thickness of 40 nm, and an SiN protective layer was formed at a thickness of 70 nm in that order, thus producing a magnetooptical recording medium.

The composition of the GdFeCo reproducing layer was set so that it was RE rich at room temperature, the saturation magnetization $M_s$ was 180 emu/cc, the compensation temperature was 240° C., and the Curie temperature was not less than 300° C. The composition of the GdFe intermediate layer was set so that it was RE rich at room temperature, the saturation magnetization $M_s$ was 480 emu/cc, and the Curie temperature was 190° C. Also, the composition of the TbFeCo memory layer was set so that it was TM rich at room temperature, the saturation magnetization $M_s$ was 150 emu/cc, and the Curie temperature was 250° C.

After that, similarly as in Examples 2 and 3, mark length dependence of C/N ratio and crosstalk were measured. The results are listed in Table 1.

TABLE 1

| Mark Length | C/N (dB) | | | Crosstalk (dB) |
|---|---|---|---|---|
| | 0.78 μm | 0.40 μm | 0.03 μm | 0.78 μm |
| Example 2 | 50.0 | 45.6 | 39.2 | −38 |
| Example 3 | 50.2 | 45.7 | 39.8 | −39 |
| Comparative Example 1 | 50.1 | 36.8 | 22.0 | −32 |
| Comparative Example 2 | 50.2 | 42.0 | 35.6 | −36 |

As apparent from the measurement results listed in Table 1, the media of Examples 2, 3 according to the present invention demonstrated high C/N ratios without the application of the reproducing magnetic field, particularly in the measurement results of short mark lengths, and improvement in crosstalk at the same time. On the other hand, the medium of Comparative Example 1 failed to achieve sufficient C/N ratios. Further, the medium of Comparative Example 2 also failed to achieve C/N ratios comparative to those of the media of the present invention.

Next, using the media of the above Examples 2, 3 and the medium of Comparative Example 2, the recording of mark length 0.4 μm was carried out in the media and reproduction was carried out as applying the external magnetic field. The results confirmed that the media of Examples 2, 3 showed no deterioration of C/N ratios even with the application of the external magnetic field of ±500 Oe. In contrast, the medium of Comparative Example 2 showed a drop of the C/N ratio of about 2 dB with the application of the external magnetic field of ±300 Oe, and a drop in the C/N ratio of not less than 5 dB with the application of the external magnetic field of ±500 Oe.

From the above results, the magnetooptical recording media of the present invention can demonstrate improvement both in C/N ratio and crosstalk with applying no reproducing magnetic field alone or with applying neither the initialization magnetic field nor the reproducing magnetic field, and can increase both the linear recording density and the track density.

What is claimed is:

1. A magnetooptical recording medium comprising:

a transparent substrate;

a first magnetic layer laid on said substrate, said first magnetic layer having in-plane magnetization at room temperature and vertical magnetization at an elevated temperature;

a second magnetic layer for storing information, said second magnetic layer being laid on said first magnetic layer and having vertical magnetization between the room temperature and a Curie temperature thereof; and a third magnetic layer disposed between said first magnetic layer and said second magnetic layer and made of a magnetic phase transition material undergoing reversible transition from antiferromagnetism to ferromagnetism;

wherein the antiferromagnetism-ferromagnetism phase transition temperature of said third magnetic layer is near a temperature at which said first magnetic layer changes from in-plane magnetization to vertical magnetization.

2. The magnetooptical recording medium according to claim 1, wherein said third magnetic layer comprises a main component of FeRh.

3. An information reproducing method for reproducing information from a magnetooptical recording medium comprising:

a transparent substrate;

a first magnetic layer laid on the substrate, the first magnetic layer having in-plane magnetization at room temperature and vertical magnetization at an elevated temperature;

a second magnetic layer for storing information, the second magnetic layer being laid on the first magnetic layer and having vertical magnetization between the room temperature and a Curie temperature thereof; and a third magnetic layer disposed between the first magnetic layer and the second magnetic layer and made of a magnetic phase transition material undergoing a reversible transition from antiferromagnetism to ferromagnetism;

wherein an antiferromagnetism-ferromagnetism phase transition temperature of the third magnetic layer is near a temperature at which the first magnetic layer changes from in-plane magnetization to vertical magnetization, said information reproducing method comprising:

a step of forming a light spot as irradiating laser light through the substrate to the first magnetic layer;

a step of causing a temperature distribution, caused by irradiation of the medium by the laser light, to define, in the light spot, a first region in which magnetization of the first magnetic layer is oriented mainly longitudinally and in which magnetic domain information in the second magnetic layer is masked against reading by the magnetooptical effect, and a second region in which the first magnetic layer changes to vertical magnetization and in which the magnetic domain information recorded in the second magnetic layer is transferred to the first magnetic layer; and a step of reproducing the magnetic domain information in the second region by the magnetooptical effect, utilizing reflected light of the laser light.

4. The information reproducing method according to claim 3, wherein the third magnetic layer is mainly in an antiferromagnetic phase in the first region and the third magnetic layer is mainly in a ferromagnetic phase in the second region.

* * * * *

UNITED STATES PATENT AND TRADEMARK OFFICE
CERTIFICATE OF CORRECTION

PATENT NO. : 5,666,346
DATED : September 9, 1997
INVENTOR(S) : NAOKI NISHIMURA

It is certified that error appears in the above-identified patent and that said Letters Patent is hereby corrected as shown below:

COLUMN 2

Line 9, "with" should read --with respect--.

COLUMN 8

Line 57, "other," should read --other),--.

COLUMN 9

Line 46, "Of" should read --of--.

COLUMN 13

Line 5, "was $M_s$" should read --$M_s$ was--.

Signed and Sealed this

Seventeenth Day of March, 1998

Attest:

BRUCE LEHMAN

Attesting Officer      Commissioner of Patents and Trademarks